(12) United States Patent
Lore et al.

(10) Patent No.: US 11,567,350 B2
(45) Date of Patent: Jan. 31, 2023

(54) METHOD FOR DETERMINING AN ELECTRONIC SPECTACLE FRAME ELEMENT

(71) Applicant: Essilor International, Charenton-le-Pont (FR)

(72) Inventors: Marie Lore, Charenton-le-Pont (FR); Paul Gil, Charenton-le-Pont (FR); Guillaume Broutin, Charenton-le-Pont (FR); Bruno Amir, Charenton-le-Pont (FR); Jean Sahler, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 985 days.

(21) Appl. No.: 16/335,001

(22) PCT Filed: Sep. 12, 2017

(86) PCT No.: PCT/EP2017/072815
§ 371 (c)(1),
(2) Date: Mar. 20, 2019

(87) PCT Pub. No.: WO2018/054718
PCT Pub. Date: Mar. 29, 2018

(65) Prior Publication Data
US 2019/0250433 A1    Aug. 15, 2019

(30) Foreign Application Priority Data
Sep. 22, 2016 (EP) .................................... 16306222

(51) Int. Cl.
*G02C 13/00* (2006.01)
*G02C 7/08* (2006.01)

(52) U.S. Cl.
CPC .......... *G02C 13/005* (2013.01); *G02C 7/086* (2013.01); *G02C 13/003* (2013.01)

(58) Field of Classification Search
CPC ..... G02C 13/005; G02C 7/086; G02C 13/003
(Continued)

(56) References Cited

U.S. PATENT DOCUMENTS

| 6,533,418 B1 | 3/2003 | Izumitani et al. |
| 2003/0090625 A1 | 5/2003 | Izumitani et al. |

(Continued)

OTHER PUBLICATIONS

International Search Report dated Dec. 15, 2017 in PCT/EP2017/072815 filed Sep. 12, 2017.

*Primary Examiner* — Tuyen Tra
(74) *Attorney, Agent, or Firm* — Oblon, McClelland, Maier & Neustadt, L.L.P.

(57) ABSTRACT

A method for determining an electronic spectacle frame element of a spectacle frame, including providing electronic element data relating to an electronic element to be embodied in a spectacle frame element; providing predetermined spectacle frame element data related to at least one geometrical parameter of a predetermined spectacle frame element, corresponding to the wearer demand; defining a working electronic spectacle frame element including a working spectacle frame element and an electronic element embodied in the working spectacle frame element based on the electronic element data, modifying the working electronic spectacle frame element, and determining the electronic spectacle frame element by repeating the modifying step so as to minimize the difference between the geometrical parameters of the predetermined spectacle frame element and the working spectacle frame element.

15 Claims, 1 Drawing Sheet

(58) Field of Classification Search
USPC .................................. 33/200; 351/200, 204
See application file for complete search history.

(56) References Cited

U.S. PATENT DOCUMENTS

| | | |
|---|---|---|
| 2003/0123026 A1 | 7/2003 | Abitbol et al. |
| 2004/0107080 A1 | 6/2004 | Deichmann et al. |
| 2015/0055085 A1 | 2/2015 | Fonte et al. |
| 2015/0055086 A1 | 2/2015 | Fonte et al. |
| 2015/0154322 A1 | 6/2015 | Fonte et al. |
| 2015/0154678 A1 | 6/2015 | Fonte et al. |
| 2015/0154679 A1 | 6/2015 | Fonte et al. |
| 2015/0212343 A1 | 7/2015 | Fonte et al. |
| 2015/0230033 A1 | 8/2015 | Sprague et al. |
| 2016/0062151 A1 | 3/2016 | Fonte et al. |
| 2016/0062152 A1 | 3/2016 | Fonte et al. |
| 2016/0316304 A1 | 10/2016 | Sprague et al. |
| 2017/0068121 A1 | 3/2017 | Fonte et al. |
| 2017/0269385 A1 | 9/2017 | Fonte et al. |

METHOD FOR DETERMINING AN ELECTRONIC SPECTACLE FRAME ELEMENT

FIELD OF THE INVENTION

The invention relates to a method for determining an electronic spectacle frame element of a spectacle frame, a method for providing such an electronic spectacle frame element to a wearer and a method for determining an optical equipment comprising at least an optical lens and a spectacle frame having at least such an electronic spectacle frame element.

BACKGROUND OF THE INVENTION

Electronic spectacle frames have an important and rapid growth. More and more electronic spectacle frames are being develop with a greater variety of different electronic elements.

Electronic spectacle frame may comprise many different electronic elements such as sensors, displays, active lenses, batteries, processors for local processing and communication devices, and charging devices.

With the growing interest in electronic spectacle frames, it has become important to provide a solution that allows including electronic components in a spectacle frame.

It is now well known to embed electronic elements in the front part or in a temple of a spectacle frame.

However, these implementations are no longer sufficient given the increasing amount of electronic components to be integrated into the spectacle frame.

Therefore, there is a need for a solution allowing to integrate a plurality of electronic elements into the spectacle frame while being very compact and allowing connection between different parts of the spectacle frame having the electronic elements.

An aim of the present invention is to propose such solution.

SUMMARY OF THE INVENTION

To this end, the invention proposes a method implemented by computer means for determining an electronic spectacle frame element of a spectacle frame, wherein the electronic spectacle frame element comprises a spectacle frame element and an electronic element embodied in the spectacle frame element, the method comprising:
- an electronic element data providing step, during which electronic element data relating to the electronic element to be embodied in the spectacle frame element are provided;
- a predetermined spectacle frame element data providing step, during which predetermined spectacle frame element data related to at least one geometrical parameter of a predetermined spectacle frame element [corresponding to the wearer demand] are provided;
- a working electronic spectacle frame element defining step, during which a working electronic spectacle frame element comprising a working spectacle frame element and an electronic element embodied in the working spectacle frame element is defined based on the electronic element data,
- a modifying step, during which the working electronic spectacle frame element is modified, and wherein the electronic spectacle frame element is determined by repeating the modifying step so as to minimize the difference between the geometrical parameters of the predetermined spectacle frame element and the working spectacle frame element.

Advantageously, the determining method according to the invention provides a solution for optimizing the integration of electronic elements into a spectacle frame while ensuring that at least the electronic spectacle frame element is compact and allowing connections between different electronic spectacle frame elements of the spectacle frame.

According to further embodiments which can be considered alone or in combination:
- the modifying step comprises at least one of the following steps:
  - a spectacle frame element modifying step, during which the geometry of the working spectacle frame element is modified,
  - an electronic arrangement modifying step, during which the arrangement of the electronic element in the working spectacle frame element is modified;
- the spectacle frame element is a spectacle temple or a spectacle front part or a hinge configured to movably attach a spectacle temple to a spectacle front part;
- the electronic element comprises an electronic support part supporting at least one electronic component and a wire core part extending from the electronic support part through the spectacle frame element;
- the at least one electronic component comprises a sensor and/or a radio wave emitting component and/or a battery and/or a light emitting component;
- the working electronic spectacle frame element is modified considering the dimensions of the electronic element and/or considering heat dissipation when the electronic element is in the spectacle frame element;
- during the modifying step,
  - the material or different materials of the working spectacle frame element, and/or
  - the weight distribution of the working spectacle frame element, and/or
  - the shape of the working spectacle frame element,
  is modified;
- the method further comprises a manufacturing device data providing step, during which the manufacturing device data identifying the manufacturing devices available to manufacture the spectacle frame element is provided, and during the modifying step, the working spectacle frame element is modified considering the technical possibility of the manufacturing devices identified by the manufacturing data;
- the method further comprises a comfort data providing step, during which comfort data related at least to the weight of the working spectacle frame element and the electronic element are provided; and during the modifying step, the weight of the working electronic spectacle frame element is determined based on the comfort data and the working spectacle frame element is modified considering the determined weight of the working electronic spectacle frame element;
- the method further comprises a wearer data providing step, during which wearer data comprising at least morphological wearer data related to the morphology of the head and/or face contact zones with the spectacle frame element when the spectacle frame is worn by a wearer are provided, and during the modifying step, the mechanical forces applied by the working spectacle frame element to said contact zones are determined based on the wearer data and the working spectacle frame element is modified considering the determined mechanical forces;

the method further comprises an aesthetic data providing step, during which aesthetic data related to the aesthetic of the working spectacle frame element when the spectacle frame is worn by a wearer are provided, and during the modifying step, the working spectacle frame element is modified considering the aesthetic data;

the predetermined spectacle frame element is selected in a spectacle frame element database according to at least one predetermined parameter;

the predetermined parameter is a shape style parameter and/or a shape size parameter and/or a thickness parameter and/or a material parameter and/or an aesthetic parameter and/or a statistic parameter.

The invention also relates to a method of providing an electronic spectacle frame element to a wearer, the electronic spectacle frame element comprising a spectacle frame element and at least one electronic element, the spectacle frame element being configured to embody at least one of the at least one electronic element, the method comprising the steps of:

determining the electronic spectacle frame element according to any of the preceding claims, and manufacturing the determined electronic spectacle frame element.

Another object of the invention relates to a method implemented by computer means for determining an optical equipment comprising at least an optical lens and a spectacle frame, wherein:

the optical lens is adapted to be mounted in the spectacle frame, the spectacle frame comprises a plurality of spectacle frame elements among which at least one spectacle frame element is an electronic spectacle frame element embodying at least one electronic element, and the method comprises at least for each electronic spectacle frame element, the steps of determining a spectacle frame element according to any of the preceding claims.

Advantageously, the method for determining an optical equipment according to the invention provides a solution for creating and optimizing an optical equipment comprising electronic elements embedded into a spectacle frame.

According to a further aspect, the invention relates to a computer program product comprising one or more stored sequences of instructions that are accessible to a processor and which, when executed by the processor, causes the processor to carry out the steps of the method for determining a spectacle frame element according to the invention.

The invention further relates to a computer readable medium carrying one or more sequences of instructions of the computer program product according to the invention.

Furthermore, the invention relates to a program which makes a computer execute at least the method for determining a spectacle frame element of the invention.

The invention also relates to a computer-readable storage medium having a program recorded thereon; where the program makes the computer execute at least the method for determining a spectacle frame element of the invention.

The invention further relates to a device comprising a processor adapted to store one or more sequence of instructions and to carry out at least one of the steps of the method according to the invention.

Unless specifically stated otherwise, as apparent from the following discussions, it is appreciated that throughout the specification discussions utilizing terms such as "computing", "calculating", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer or Digital Signal Processor ("DSP") selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs) electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays are not inherently related to any particular computer or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the inventions as described herein.

BRIEF DESCRIPTION OF THE DRAWINGS

Embodiments of the invention will now be described, by way of examples only, and with reference to the following drawings in which.

Elements in the figures are illustrated for simplicity and clarity and have not necessarily been drawn to scale. For example, the dimensions of some of the elements in the figure may be exaggerated relative to other elements to help improve the understanding of the embodiments of the present invention.

DETAILED DESCRIPTION OF PREFERRED EMBODIMENTS

Figure 1:
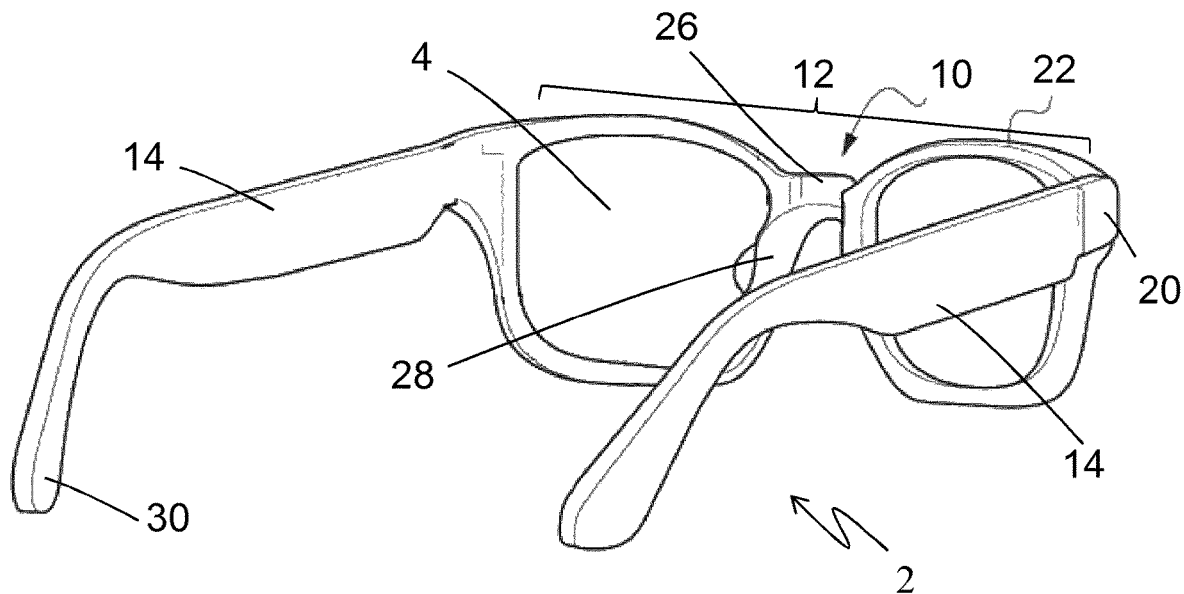
FIG. 1 is a schematic representation of an optical equipment comprising a spectacle frame according to the invention.
Figure 2:
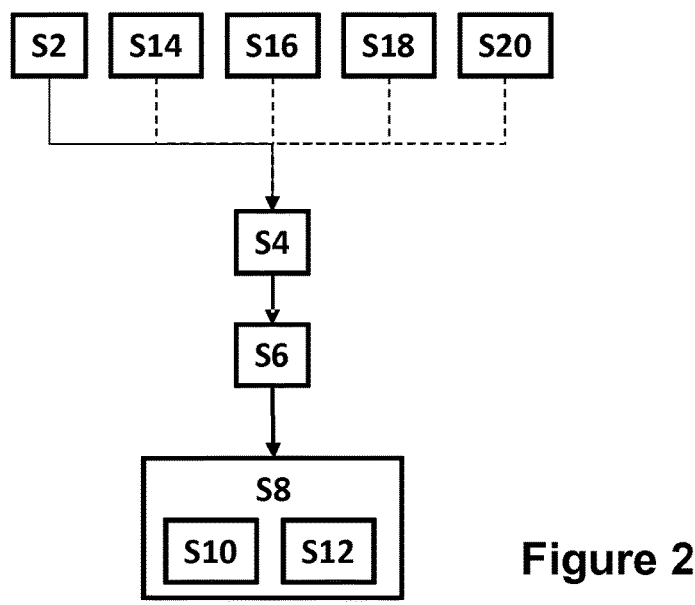
FIG. 2 is flowchart representing the steps of a method for determining an electronic spectacle frame element according to an embodiments of the invention.

FIG. 1 represents an example of an optical equipment 2 comprising at least an optical lens 4 and a spectacle frame 10.

The or each optical lens 4 is adapted to be mounted in the spectacle frame 10.

In the framework of the invention, the term "optical lens" is to be understood to mean any type of known lens intended to be supported by a wearer's face. The term can refer to ophthalmic lenses such as corrective lenses, non-corrective lenses, semi-finished lenses, such as progressive addition lenses, unifocal or multifocal lenses. The term can also refer to said ophthalmic lenses which could present at least one added value such as, for example, tint, photochromism, polarization filtering, electrochromism, antireflective properties, antiscratch properties . . . .

The optical equipment may comprise a single optical lens covering either both eyes of the wearer, for example goggles or masks, or only one eye, for example a head mounted display. The optical equipment may comprise two optical lenses each covering an eye of the wearer. The term can refer to ophthalmic optical equipment, non-ophthalmic optical equipment, sunglasses, glasses for sporting applications such as goggles, reading glasses, protective glasses, driving glasses.

The spectacle frame 10 comprises a front part 12, a first and second sides or temples 14. The first and second temples 14 are configured to be attached to the front part 12 using hinges 20 and screws.

As represented on FIG. 1, the front part 12 may comprise frame rims 22 arranged to receive optical lenses 4, for example ophthalmic lenses. The frame rims are linked by a bridge 26 and may comprise nose pad 28 arranged to rest on the nose of the user when the frame in worn.

The first and second temples may comprise pads or tips 30 arranged to fit around the ears of a user when the frame is being worn by said user.

Furthermore, among the spectacle frame elements of the spectacle frame, at least one spectacle frame element is an electronic spectacle frame element embodying at least one electronic element.

The electronic element comprises an electronic support part supporting at least one electronic component and a wire core part extending from the electronic support part through the spectacle frame element. The wire core part may be tubular and electrical wire(s) and/or optical fiber(s) may extend from the electronic component trough the tubular wire core part.

For example, the electronic component may comprise at least a sensor, a radio wave emitting component, a battery and/or a light emitting component.

The electronic spectacle frame element embodying the electronic element can be front part 12, at least one temple 14, at least one tip 30 or at least a hinge 20 of the spectacle frame. At least one electronic spectacle frame element of the spectacle frame is determined by a method according to the invention.

The method implemented by computer means for determining an electronic spectacle frame element of a spectacle frame according to the invention will be now detailed.

The spectacle frame element is a spectacle temple or a spectacle front part or a hinge configured to movably attach a spectacle temple to a spectacle front part.

The method comprises at least:
an electronic element data providing step S2,
a predetermined spectacle frame element data providing step S4,
a working electronic spectacle frame element defining step S6,
a modifying step S8, and
Furthermore, the electronic spectacle frame element is determined by repeating the modifying step so as to minimize the difference between the geometrical parameters of the predetermined spectacle frame element and the working spectacle frame element.

During the electronic element data providing step S2, electronic element data relating to the electronic element to be embodied in the spectacle frame element are provided.

Predetermined spectacle frame element data related to at least one geometrical parameter of a predetermined spectacle frame element are provided during the predetermined spectacle frame element data providing step S4. The predetermined spectacle frame element is preferably a spectacle frame element corresponding or being close to the wearer demand.

During the working electronic spectacle frame element defining step S6, a working electronic spectacle frame element is defined based on the electronic element data. The electronic spectacle frame element comprises a working spectacle frame element and an electronic element embodied in the working spectacle frame element.

During the modifying step S8, the working electronic spectacle frame element is modified.

Preferably, the working electronic spectacle frame element is modified considering the dimensions of the electronic element and/or considering heat dissipation when the electronic element is in the spectacle frame element.

Moreover, during the modifying step S8, the material or different materials of the working spectacle frame element and/or the weight distribution of the working spectacle frame element and/or the shape of the working spectacle frame element is preferably modified.

Advantageously, the modifying step S8 further comprises a spectacle frame element modifying step S10, during which the geometry of the working spectacle frame element is modified.

Preferably, the modifying step S8 can further comprise an electronic arrangement modifying step S12, during which the arrangement of the electronic element(s) in the working spectacle frame element is modified.

According to a first embodiment, the method further comprises a manufacturing device data providing step S14, during which the manufacturing device data identifying the manufacturing devices available to manufacture the spectacle frame element are provided.

For example the manufacturing possibly may be very different for an additive manufacturing device than for a subtractive manufacturing device. Advantageously, according to such embodiment, such technical difference may be considered during the determining step S14.

The working spectacle frame element is modified considering the technical possibility of the manufacturing devices identified by the manufacturing data during the modifying step S8.

According to a second embodiment compatible with the previous one, the method further comprises a comfort data providing step S16, during which comfort data related at least to the weight of the working spectacle frame element and the electronic element are provided.

The term weight is to be understood as the weight of the object itself (as described for example in the international standard ISO80000-4(2006)), and the repartition of said weight in the object.

Then, during the modifying step S8, the weight of the working electronical spectacle frame element is determined based on the comfort data, and the working spectacle frame element is modified considering the determined weight of the working electronical spectacle frame element.

The comfort data may directly relate to the total weight of the working electronic spectacle frame element and also of the optical equipment integrating the working electronic spectacle frame element. Indeed, generally the lighter the optical equipment is the more comfortable it may be considered. For example, the comfort data may be arranged so as to be minimum when the weight of the optical equipment is minimum.

The comfort data may also be arranged so as to consider the balance of weight between the front and back sides of the optical equipment and/or between the left and right sides.

For example, the comfort data is provided so as to be minimum when the difference of weight of the optical equipment between the right and left sides corresponds to a first predetermined value. The weight of the right and left side should be understood as the weight supported by the right and left side of the wearer when wearing the optical equipment.

The first predetermined value may be set according to a postural preferential use of the optical equipment and/or morphological data of the wearer. For example, the first predetermined value may be set to zero, so as to provide a balance of weight between the right and left sides of the optical equipment.

Advantageously, such comfort data can be used to compensate for a difference of weight between the right and left optical lenses. Thus, the pressure applied by the optical equipment on the wearer's pinna and nose may be balanced, providing a greater comfort to the wearer.

According to a third embodiment compatible with the previous ones, the method further comprises a wearer data providing step S18. During this step S18, wearer data comprising at least morphological wearer data related to the morphology of the head and/or face contact zones with the spectacle frame element when the spectacle frame is worn by a wearer are provided.

It is understood that in said embodiment, the head and/or face contact zones are represented by the nose and pinna of the wearer.

Then, the mechanical forces applied by the working spectacle frame element to said contact zones, when the optical equipment is worn by the wearer in static or dynamic mode, are determined based on the wearer data. Morphological wearer data such as the shape and position of the nose and pinna of the wearer may be used to determine the forces applied by the optical equipment.

For example, among the different forces applying to the wearer when wearing the optical equipment, gravity, clamping forces and friction forces at the head and/or face contact zones with the optical equipment are of particular interest for the invention.

The working spectacle frame element is then modified considering the determined mechanical forces, during the modifying step S8.

According to a fourth embodiment compatible with the previous ones, the method further comprises an aesthetic data providing step S20, during which aesthetic data related to the aesthetic of the working spectacle frame element when the spectacle frame is worn by a wearer are provided.

The aesthetic data may relate to individual proper fit parameters of the optical equipment and/or wearer's aesthetic requirements or taste and/or impression ratings of the combination between the wearer morphology and the optical equipment.

Morphological wearer data may be used to determine such parameters in combination or not with hair style, hair color, eye color, spectacle frame color and/or wearer's preferences and style.

Face, eye, nose, temples and/or eyebrow features may be used as morphological wearer data.

Then, during the modifying step S8, the working spectacle frame element is modified considering the aesthetic data.

For example, the aesthetic data may relate at least to the horizontality of the optical equipment when worn by the wearer.

According to a fifth embodiment compatible with the previous ones, the predetermined spectacle frame element is preferably selected in a spectacle frame element database according to at least one predetermined parameter.

For example, at least one of the predetermined parameters used to select the predetermined spectacle frame element is:
 a shape style parameter,
 a shape size parameter,
 a thickness parameter,
 a material parameter,
 an aesthetic parameter,
 a statistic parameter which can correspond to a "trend parameter" related to a global analysis of the database.

Thus, a wearer can set a predetermined parameter corresponding to his criteria and the method according to the invention allows to find the better spectacle frames in the database according to his criteria.

Such spectacle frame element database can be generated according to a method comprising at least the steps of:
 getting a list of images of at least a spectacle frame element. For example, the images can be screenshots from a web site or downloaded from a catalogue.
 processing an analysis of these images in order to get specific data related to a shape style parameter, a shape size parameter, a thickness parameter, a material parameter and/or an aesthetic parameter.

Another object of the invention relates to a method of providing an electronic spectacle frame element to a wearer. The electronic spectacle frame element comprises a spectacle frame element and at least one electronic element. Furthermore, the spectacle frame element is configured to embody at least one of the at least one electronic element.

According to this method, the electronic spectacle frame element is determined according to the determining method according to the invention and described hereinbefore.

Then, the determined electronic spectacle frame element is manufactured accordingly.

This method can be implemented for each electronic spectacle frame element of a spectacle frame to be provided to a user.

More particularly, the invention also relates to a method implemented by computer means for determining an optical equipment comprising at least an optical lens and a spectacle frame.

The optical lens is adapted to be mounted in the spectacle frame.

The spectacle frame comprises a plurality of spectacle frame elements among which at least one spectacle frame element is an electronic spectacle frame element embodying at least one electronic element.

According to the invention, the method comprises at least for each electronic spectacle frame element, the determination of the spectacle frame element according to the determining method of the invention and described hereinbefore.

The invention has been described above with the aid of embodiments without limitation of the general inventive concept.

Many further modifications and variations will suggest themselves to those skilled in the art upon making reference to the foregoing illustrative embodiments, which are given by way of example only and which are not intended to limit the scope of the invention, that being determined solely by the appended claims.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:

1. A method implemented by computer for determining an electronic spectacle frame element of a spectacle frame, wherein the electronic spectacle frame element comprises a spectacle frame element and an electronic element embodied in the spectacle frame element, the method comprising:
an electronic element data providing step, during which electronic element data relating to the electronic element to be embodied in the spectacle frame element are provided;
a predetermined spectacle frame element data providing step, during which predetermined spectacle frame element data related to at least one geometrical parameter of a predetermined spectacle frame element, corresponding to the wearer demand, are provided;
a working electronic spectacle frame element defining step, during which a working electronic spectacle frame element comprising a working spectacle frame element and an electronic element embodied in the working spectacle frame element is defined based on the electronic element data,
a modifying step, during which the working electronic spectacle frame element is modified, and
wherein the electronic spectacle frame element is determined by repeating the modifying step so as to minimize the difference between the geometrical parameters of the predetermined spectacle frame element and the working spectacle frame element.

2. The method according to claim 1, wherein the modifying step comprises at least one of the following steps:
a spectacle frame element modifying step, during which the geometry of the working spectacle frame element is modified,
an electronic arrangement modifying step, during which the arrangement of the electronic element in the working spectacle frame element is modified.

3. The method according to claim 1, wherein the spectacle frame element is a spectacle temple or a spectacle front part or a hinge configured to movably attach a spectacle temple to a spectacle front part.

4. The method according to claim 1, wherein the electronic element comprises an electronic support part supporting at least one electronic component and a wire core part extending from the electronic support part through the spectacle frame element.

5. The method according to claim 4, wherein at least one electronic component comprises a sensor and/or a radio wave emitting component and/or a battery and/ or a light emitting component.

6. The method according to claim 1, wherein the working electronic spectacle frame element is modified considering the dimensions of the electronic element and/or considering heat dissipation when the electronic element is in the spectacle frame element.

7. The method according to claim 1, wherein during the modifying step, the material or different materials of the working spectacle frame element, and/or
the weight distribution of the working spectacle frame element, and/or
the shape of the working spectacle frame element, is modified.

8. The method according to claim 1, wherein:
the method further comprises a manufacturing device data providing step, during which the manufacturing device data identifying the manufacturing devices available to manufacture the spectacle frame element are provided, and
during the modifying step, the working spectacle frame element is modified considering the technical possibility of the manufacturing devices identified by the manufacturing data.

9. The method according to claim 1, wherein:
the method further comprises a comfort data providing step, during which comfort data related at least to the weight of the working spectacle frame element and the electronic element are provided; and
during the modifying step, the weight of the working electronical spectacle frame element is determined based on the comfort data and the working spectacle frame element is modified considering the determined weight of the working electronical spectacle frame element.

10. The method according to claim 1, wherein:
the method further comprises a wearer data providing step, during which wearer data comprising at least morphological wearer data related to the morphology of the head and/or face contact zones with the spectacle frame element when the spectacle frame is worn by a wearer are provided, and
during the modifying step, the mechanical forces applied by the working spectacle frame element to said contact zones are determined based on the wearer data and the working spectacle frame element is modified considering the determined mechanical forces.

11. The method according to claim 1, wherein:
the method further comprises an aesthetic data providing step, during which aesthetic data related to the aesthetic of the working spectacle frame element when the spectacle frame is worn by a wearer are provided, and
during the modifying step, the working spectacle frame element is modified considering the aesthetic data.

12. The method according to claim 1, wherein the predetermined spectacle frame element is selected in a spectacle frame element database according to at least one predetermined parameter.

13. The method according to claim 12, wherein the predetermined parameter is a shape style parameter and/or a shape size parameter and/or a thickness parameter and/or a material parameter and/or an esthetic parameter and/or a statistic parameter.

14. A method of providing an electronic spectacle frame element to a wearer, the electronic spectacle frame element comprising a spectacle frame element and at least one electronic element, the spectacle frame element being configured to embody at least one of the at least one electronic element, the method comprising the steps of:
determining the electronic spectacle frame element according to claim 1, and
manufacturing the determined electronic spectacle frame element.

15. A method implemented by computer for determining an optical equipment comprising at least an optical lens and a spectacle frame, wherein:
- the optical lens is adapted to be mounted in the spectacle frame,
- the spectacle frame comprises a plurality of spectacle frame elements among which at least one spectacle frame element is an electronic spectacle frame element embodying at least one electronic element, and
- the method comprises at least for each electronic spectacle frame element, the steps of determining a spectacle frame element according to claim 1.

* * * * *